United States Patent
Tomonaga

(10) Patent No.: US 7,979,663 B2
(45) Date of Patent: Jul. 12, 2011

(54) STORAGE APPARATUS HAVING UNUSED PHYSICAL AREA AUTONOMOUS MANAGEMENT FUNCTION

(75) Inventor: Kazusa Tomonaga, Koganei (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 658 days.

(21) Appl. No.: 12/039,777

(22) Filed: Feb. 29, 2008

(65) Prior Publication Data

US 2008/0228990 A1 Sep. 18, 2008

(30) Foreign Application Priority Data

Mar. 7, 2007 (JP) ................................ 2007-057531

(51) Int. Cl.
- G06F 12/06 (2006.01)
- G06F 12/02 (2006.01)
- G06F 12/00 (2006.01)

(52) U.S. Cl. ......... 711/170; 711/156; 711/202; 711/203

(58) Field of Classification Search .................. 711/156, 711/170, 202, 203

See application file for complete search history.

(56) References Cited

U.S. PATENT DOCUMENTS

| | | | |
|---|---|---|---|
| 6,530,035 B1* | 3/2003 | Bridge | 714/6.12 |
| 6,564,307 B1* | 5/2003 | Micka et al. | 711/156 |
| 6,636,941 B1* | 10/2003 | Gold et al. | 711/112 |
| 6,789,161 B1* | 9/2004 | Blendermann et al. | 711/111 |
| 6,898,670 B2* | 5/2005 | Nahum | 711/114 |
| 7,024,526 B2 | 4/2006 | Watanabe | |
| 7,162,600 B2* | 1/2007 | Kano et al. | 711/162 |
| 7,275,139 B1* | 9/2007 | Tormasov et al. | 711/159 |
| 7,574,560 B2* | 8/2009 | MacHardy et al. | 711/114 |
| 7,613,945 B2* | 11/2009 | Soran et al. | 714/5 |
| 7,831,560 B1* | 11/2010 | Spertus et al. | 707/639 |
| 2008/0183777 A1* | 7/2008 | Xi et al. | 707/205 |
| 2008/0263293 A1* | 10/2008 | Kishi et al. | 711/159 |
| 2009/0240880 A1* | 9/2009 | Kawaguchi | 711/114 |
| 2010/0042802 A1* | 2/2010 | Helman et al. | 711/173 |
| 2010/0262802 A1* | 10/2010 | Goebel et al. | 711/166 |

FOREIGN PATENT DOCUMENTS

JP 2005-234820 9/2005

OTHER PUBLICATIONS

Joukov et al. Adding secure deletion to your favorite file system. Security in Storage Workshop, Dec. 13, 2005. SISW '05. Third IEEE International.*

Notice of Reasons for Rejection mailed Feb. 3, 2009 from Japanese Patent Office for a corresponding Japanese Patent Application No. 2007-057531.

"3PAR Thin Provisioning," http://www.3par.com/products/thinprovisioning.html.

* cited by examiner

Primary Examiner — Sanjiv Shah
Assistant Examiner — Samuel Dillon
(74) Attorney, Agent, or Firm — Finnegan, Henderson, Farabow, Garrett & Dunner, L.L.P.

(57) ABSTRACT

A physical extent assurance unit manages correspondence of a logical disk accessed from a host computer with physical extents. A data pattern generation response unit generates a predetermined data pattern, and returns this data pattern in response to a data request from the host computer. A pattern matching unit checks the data pattern of a storage area every access to storage media or periodically. When the entire area of the assured physical extent defines the predetermined data pattern, the pattern matching unit deleted the logical disk allocation of the assured physical extent.

7 Claims, 7 Drawing Sheets

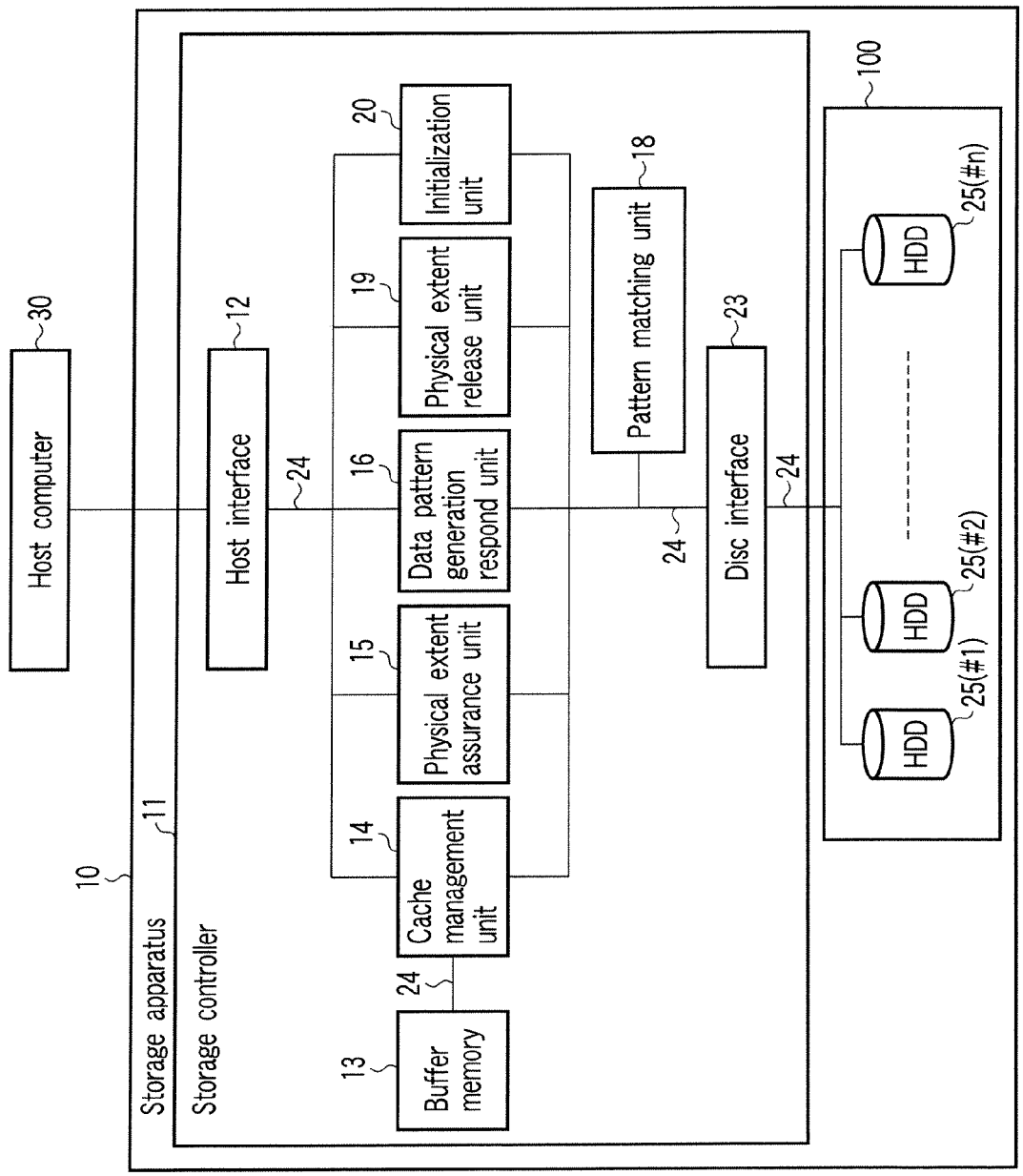
F I G. 1

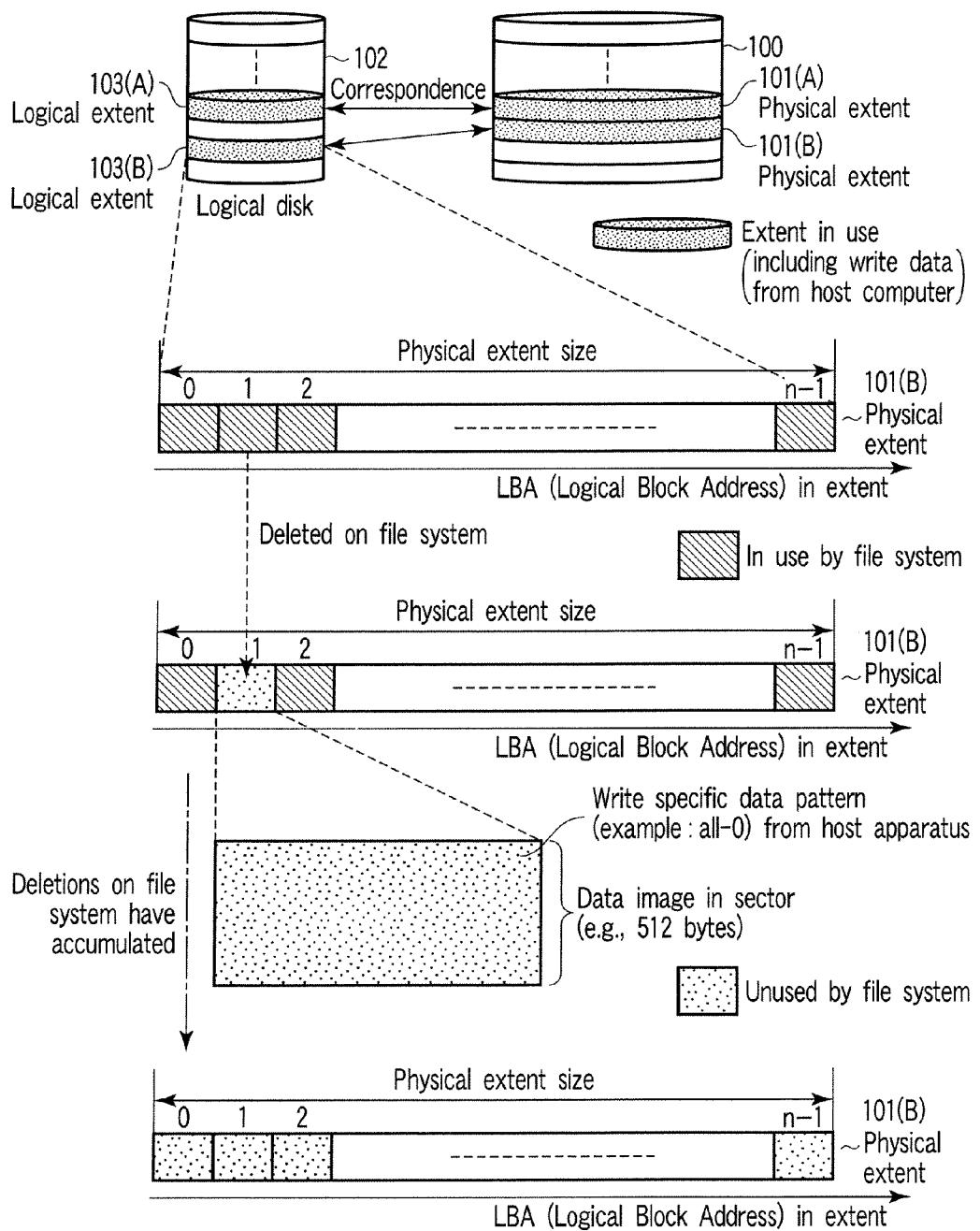
F I G. 2

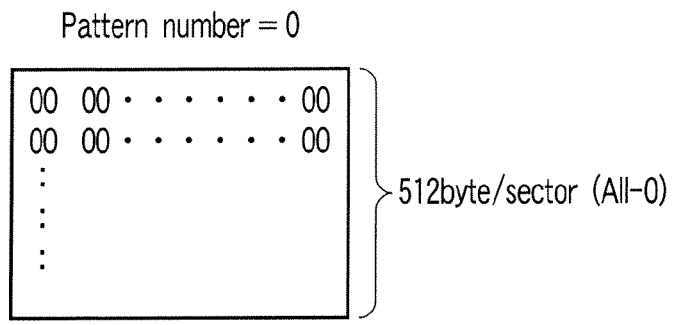
FIG. 11A
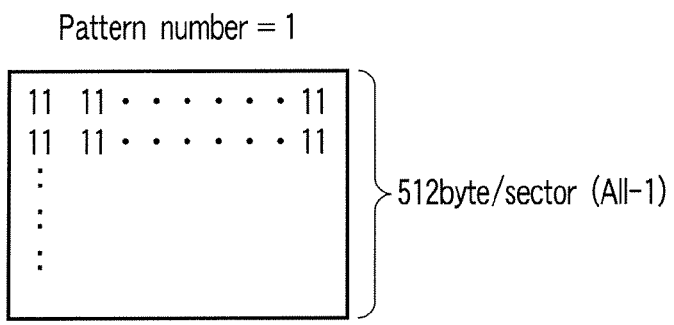
FIG. 11B
| Extent number of logical extent to which no physical extent is allocated | Pattern number |
|---|---|
| ⋮ | ⋮ |
| 100 | 0 |
| 101 | 1 |
| ⋮ | ⋮ |
FIG. 12

STORAGE APPARATUS HAVING UNUSED PHYSICAL AREA AUTONOMOUS MANAGEMENT FUNCTION

CROSS-REFERENCE TO RELATED APPLICATIONS

This application is based upon and claims the benefit of priority from prior Japanese Patent Application No. 2007-057531, filed Mar. 7, 2007, the entire contents of which are incorporated herein by reference.

BACKGROUND OF THE INVENTION

1. Field of the Invention

The invention relates to a storage apparatus which comprises a plurality of storage media such as HDDs and, more particularly, to a storage apparatus which has an unused physical area autonomous management function of creating a virtual logical disk, and assuring a physical area in correspondence with an actual use size.

2. Description of the Related Art

Conventionally, in a storage apparatus which comprises storage media such as HDDs to configure an array, a correspondence between a logical volume in which a host apparatus which uses the storage apparatus accesses a subsystem that manages the array, and the array configured by one or more storage media that define that logical volume is fixed, and the ratio of an area which is not used as the logical volume in practice becomes high, resulting in a large waste.

Hence, a virtual logical disk system which manages a physical area by segmenting the physical area into extents each having a predetermined size, and actually assures an extent in which a write access to the logical volume has occurred has been developed (http://www.3par.com/products/thinprovisioning.html (storage product available from 3PARData, Inc., U.S.A.)).

However, such a virtual logical disk system suffers the following problems.

That is, with a storage apparatus of this type, if a storage area which was used once but becomes available as a new data allocation again as a result of deletion of files or that of a partition can be released, a physical storage area can be used more efficiently.

However, with this virtual logical disk system, there is no standard scheme for explicitly communicating an area which becomes unused or available again in a file system of a host apparatus to a storage apparatus. For this reason, communicating new-unused sectors from the host apparatus to the storage apparatus and managing management information of these unused sectors on the storage apparatus side lead to a huge management information size. Also, since management information is checked every disk access, the system performance may deteriorate (problem 1).

As for an area becomes unused again and an area in which data has never been written of the logical disk in use, data of a physical area can be read by issuing a read request from a layer lower than the file system to the storage device as a physical disk. For this reason, when a plurality of users can access an identical logical disk or when a physical extent previously used by a certain user is allocated to a logical disk used by another user, data of a deleted sector area and unused sector area are read from a storage, resulting in a risk of information leakage to ill-intentioned users and the like (problem 2).

BRIEF SUMMARY OF THE INVENTION

The invention has been made in consideration of the above situation, and has as its first object to provide a storage apparatus which allows an unused physical extent on a logical disk to be reused for another application without requiring any management information of each unused sector, so as to solve the aforementioned problem 1.

It is the second object of the invention to provide a storage apparatus which can prevent old data on a physical area, to which a write access has not been made since a physical extent was allocated to a physical area or logical disk where deleted files existed from being read from a host apparatus, so as to solve the aforementioned problem 2.

In order to achieve the above objects, the invention takes the following measures.

That is, a first aspect of the invention is directed to a storage apparatus which configures an array that combines one or more storage media and defines storage areas of the storage media as a continuous single area, segments an entire area of the array into a plurality of physical extents, and configures and allocates a logical disk recognizable from a host computer by combining one or more physical extents. This storage apparatus comprises a unit configured to manage correspondences of the physical extents on the logical disk accessed from the host computer, and to assure a physical extent corresponding to a logical extent of interest of logical extents as areas of the logical disk associated with the physical extents every time a write access is received to a logical extent corresponding to the physical extent not assuring from the host computer. Also, the apparatus comprises a unit configured to generate a predetermined data pattern and to return the predetermined data pattern as read data in response to a read request from the host computer. Furthermore, the apparatus comprises a deleting unit configured to detect whether or not an entire area of the assured physical extent defines the predetermined data pattern by checking a data pattern of a storage area every time an access to the storage media is made or periodically, and to delete, when the entire area of the assured physical extent defines the predetermined data pattern, a logical disk allocation of the assured physical extent. Moreover, the apparatus comprises a unit configured to detect, when the host computer issues a delete request of data of a file created on the logical disk, that the entire area of the assured physical extent defines the predetermined data pattern by writing the predetermined data pattern in a storage area where the data to be deleted was stored, to release the assured physical extent, and to return the predetermined data pattern when the host computer issues a read request to the released physical extent.

A second aspect of the invention is directed to the storage apparatus according to claim 1, which further comprises a unit configured to define an initial correspondence between the physical extent and the logical disk, and to initialize the entire area of the physical extent by the predetermined data pattern upon defining the correspondence.

A third aspect of the invention is directed to the storage apparatus according to the first aspect of the invention, wherein the deleting unit makes a disk drive access which aims at a patrol including at least one of RAID redundancy data consistency confirmation of the array and disk media access availability check simultaneously with the checking.

A fourth aspect of the invention is directed to the storage apparatus according to the first aspect of the invention, wherein the deleting unit checks the data pattern of the storage area in turn from a first sector of the physical extent, holds an unused end address as an address of a last sector of the continuous predetermined data pattern, sets an address of a sector immediately before checked sectors which undergo a write access as the unused end address when the write access is made to the checked sectors, determines that the entire area of the physical extent is unused when the unused end address matches an end address of the physical extent, and deletes the logical disk allocation of the physical extent.

A fifth aspect of the invention is directed to the storage apparatus according to the fourth aspect of the invention, which further comprises a buffer memory configured to temporarily store data corresponding to a write request from the host computer before the data is written in the storage media, and a data bus configured to connect the storage media and the buffer memory. The deleting unit checks the data pattern of the storage area on the data bus upon making a direct memory access between the storage media and the buffer memory, and when the deleting unit detects sectors of the predetermined data pattern, and when addresses of the sectors include an address which neighbors the unused end address in a direction to increment an address, the deleting unit sets an end address of the access with the predetermined data pattern, which includes the neighboring address, as a new unused end address.

A sixth aspect of the invention is directed to the storage apparatus according to the fourth aspect of the invention, wherein the deleting unit checks the data pattern on the data bus not for all sectors but for only data with a predetermined size in a predetermined area in one or a plurality of predetermined sectors, and when the data matches the predetermined pattern data, the deleting unit checks the data pattern for all the sectors.

A seventh aspect of the invention is directed to the storage apparatus according to the first aspect of the invention, which further comprises a unit configured to transfer, when a read access to a logical extent, to which the physical extent is not allocated, is received from the host computer, the predetermined data pattern to the host computer as read data.

An eighth aspect of the invention is directed to the storage apparatus according to the first aspect of the invention, wherein a plurality of predetermined data patterns exist. The deleting unit detects whether or not the entire area of the assured physical extent defines one of the plurality of predetermined data patterns. When the deleting unit detects that the entire area of the assured physical extent defines one of the plurality of predetermined data patterns, it deletes the logical disk allocation of the assured physical extent. The storage apparatus further comprises a unit configured to hold predetermined data pattern types for the logical extents, and to return, when a read request is received from the host computer, a data pattern corresponding to the data pattern type held in association with the corresponding logical extent to the host computer.

According to the storage apparatus of the invention, a predetermined data pattern is written in a deleted sector area, and an unused physical area can be autonomously recognized by detecting this predetermined data pattern for respective sectors. As a result, a physical extent which is unused on a logical disk can be reused for another application without requiring management information of each unused sector, thus solving problem 1.

According to the storage apparatus of the invention, since data can be prevented from being read from the host apparatus, problem 2 can be solved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an example of the arrangement of a storage apparatus according to the first embodiment of the invention;

FIG. 2 is a schematic view for explaining the configuration of a logical disk;

FIGS. 11A and 11B respectively show an all-0 data pattern and an all-1 data pattern; and FIG. 12 is a view showing an example of a correspondence table between the data pattern numbers and logical extent numbers held by a data pattern type holding unit.

DETAILED DESCRIPTION OF THE INVENTION

Figure 3:
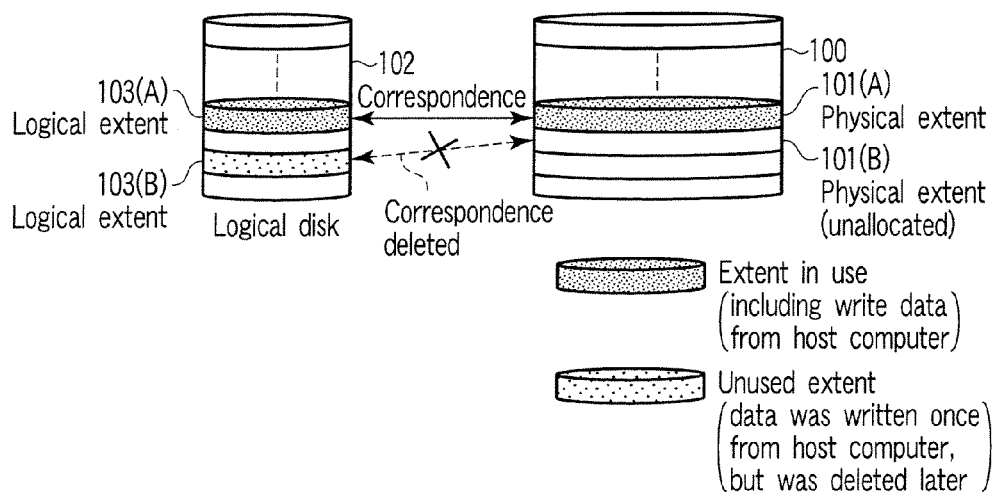
FIG. 3 is a schematic view showing an example of correspondences between physical extents and logical extends.

The best mode of carrying out the invention will be described hereinafter with reference to the accompanying drawings.

First Embodiment

FIG. 1 is a block diagram showing an example of the arrangement of a storage apparatus 10 according to the first embodiment of the invention.

FIG. 2 is a schematic view for explaining the configuration of a logical disk.

That is, a storage apparatus 10 according to this embodiment configures an array 100 which combines one or more storage media (in the following description, HDDs 25 (#1 to #n) will be used to explain these storage media although the invention is not limited to them) and defines storage areas of the HDDs 25 (#1 to #n) as a continuous single area, segments the entire area of the array 100 into a plurality of physical extents 101(A), 101(B), . . . , and configures and allocates a logical disk 102 which is recognizable from a host computer 30 by combining one or more physical extents 101.

Such storage apparatus 10 comprises the aforementioned array 100 and a storage controller 11 which manages the array 100. The storage controller 11 comprises a host interface 12, buffer memory 13, cache management unit 14, physical extent assurance unit 15, data pattern generation response unit 16, pattern matching unit 18, physical extent release unit 19, initialization unit 20, and disk interface 23. These units 13 to 20 and 23 are connected to each other via a data bus 24.

The host interface 12 controls data exchange between the host computer 30 and the storage apparatus 10. The host interface 12 receives data such as a write access, read access, and the like from the host computer 30, and transfers the received data to the units 13 to 20 via the data bus 24. Also, the host interface 12 receives data output from the units 13 to 20 to the host computer 30, and returns the received data to the host computer 30. Note that data exchange with the buffer memory 13 is made via the cache management unit 14.

The disk interface 23 controls exchange of read and write data with the HDDs 25 in the array 100. The disk interface 23 transfers data from the units 13 to 20 to the array 100, and transfers data acquired from the array 100 to the units 13 to 20. Note that data exchange with the buffer memory 13 is made via the cache management unit 14.

The physical extent assurance unit 15 manages correspondences of the physical extents 101 with the logical disk 102 accessed from the host computer 30, and assures a correspondence of the physical extent 101 corresponding to a logical extent 103 of interest of those as areas of the logical disk 102 associated with the physical extents 101 every time a write access is received from the host computer 30. Such function is also called a virtual logical volume function. For example, FIG. 2 shows that a logical extent 103(A) and physical extent 101(A), and a logical extent 103(B) and physical extent 101(B) respectively have correspondences between them. The physical extent assurance unit 15 manages and assures such correspondences.

The data pattern generation response unit 16 generates a predetermined data pattern, e.g., an all-0 data pattern. Upon reception of a read request from the host computer 30 to a logical extent to which no physical extent is allocated, the data pattern generation response unit 16 returns this predetermined data pattern as read data to the host computer 30 via the host interface 12.

The pattern matching unit 18 detects whether or not the entire physical extent 101 assured by the physical extent assurance unit 15 defines a predetermined data pattern by checking a data pattern of a storage area every access to the HDDs 25 via the disk interface 23 or periodically. If the pattern matching unit 18 detects that the entire assured physical extent 101 defines the predetermined data pattern, it deletes the allocation of the assured physical extent 101 to the logical disk 102 like the physical extent 101(B) and logical extent 103(B) shown in FIG. 3. Such checking of the data pattern of the storage area is made simultaneously with disk drive accesses which aim at patrols such as RAID redundancy data consistency confirmation of the array 100, disk media access availability check, and the like.

Figure 4:
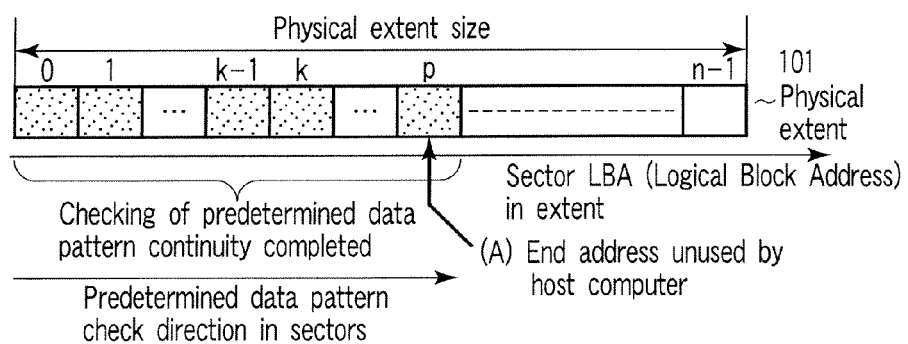
FIG. 4 is a view for explaining determination of an unused end address by pattern matching.
Figure 5:
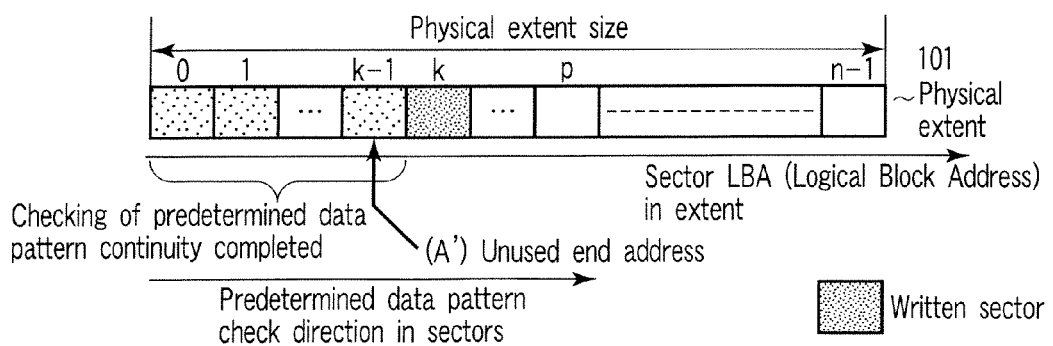
FIG. 5 is a view for explaining determination of an unused end address by pattern matching.

Upon checking a data pattern of the storage area, the pattern matching unit 18 checks in turn from the first sector (sector 0) of the physical extent 101, and holds an unused end address (sector p) as an address of the last sector of the continuous predetermined data pattern, as in an example shown in FIG. 4. As shown in an example of FIG. 5, when a write access is made to a checked sector (sector k), the pattern matching unit 18 sets the address of a sector (sector k−1) immediately before the sector (sector k) to which the write access is made as the unused end address. If the unused end address (sector k−1) matches the end address (sector n−1) of the physical extent 101, the pattern matching unit 18 determines that the entire area of that physical extent 101 are unused, and deletes the allocation of that physical extent 101 to the logical disk 102. In this way, the storage capacity of the HDDs 25 can be effectively used.

Figure 6:
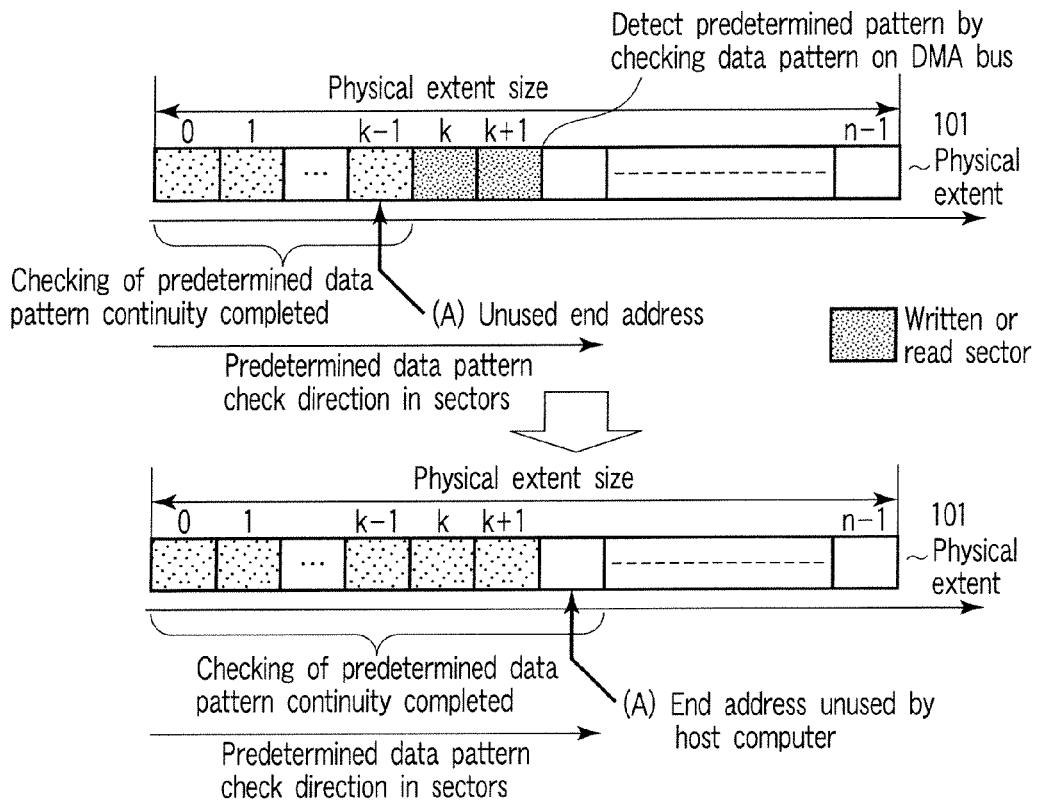
FIG. 6 is a view for explaining determination of an unused end address by pattern matching.

Furthermore, upon checking the data pattern of the storage area, the pattern matching unit 18 checks the data pattern of the storage area on the data bus 24 when a direct memory access (DMA) is made between the HDDs 25 and buffer memory 13 via the cache management unit 14. For example, when the pattern matching unit 18 detects sectors (sectors 0 to k−1) of a predetermined data pattern, as shown in FIG. 6, and when the addresses of the sectors include an address (sector k) which neighbors the unused end address (sector k−1) in a direction to increment an address, the pattern matching unit 18 sets an unused end address of an access by the predetermined data pattern including the neighboring address (sector k) as a new unused end address.

Note that the pattern matching unit 18 checks the data pattern on the data bus 24 not for all sectors (sector 0 to n−1) but for only data of a predetermined size in a predetermined area in one or a plurality of predetermined sectors. If that data matches the predetermined data pattern, the pattern matching unit 18 checks a data pattern for all the sectors (sector 0 to n−1). In this manner, the load on the storage apparatus 10 upon execution of pattern matching is reduced.

The physical extent release unit 19 releases the assured physical extent 101 when the pattern matching unit 18 determines that the entire physical extent 18 defines the predetermined data pattern.

Figure 7:
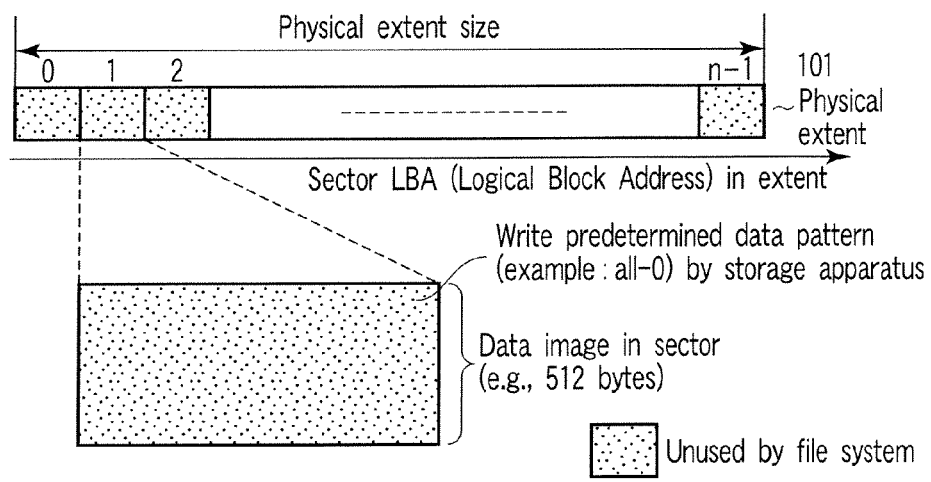
FIG. 7 is a view for explaining an initial state upon allocating a physical extent to a logical disk.

The initialization unit 20 defines an initial correspondence between the physical extent 101 and the logical disk 102. When the physical extent 101 is allocated to the logical disk 102, the initialization unit 20 initializes some or all of the sectors (sectors 0 to n−1) of the entire area of the physical extent 101 shown in FIG. 7 by a predetermined data pattern, e.g., an all-0 data pattern, as shown in, e.g., FIG. 8. In this way, since, for example, an unused sector like sector 1 shown in FIG. 7 is managed in the same manner deleted sectors, the allocation of the physical extent 101 to the logical disk 102 is released more efficiently. When the entire area of the physical extent 101 including sectors in which data has never been written becomes unused or available again, the physical extent 101 is released. Note that such initialization of the physical extent 101 may be done at any timing before the physical extent 101 is allocated to the logical disk 102. That is, such initialization can be done at a first startup timing of the storage apparatus 10, an allocation timing of the physical extent 101 to the logical extent 103, a release timing of allocation, to the logical disk 102, of the physical extent 101 allocated once to the logical disk 102, and the like.

Upon reception of a write request from the host computer 30, the cache management unit 14 temporarily stores this data in the buffer memory 13 before that data is written in the HDDs 25.

The buffer memory 13 temporarily stores data corresponding to a write request from the host computer 30 under the management of the cache management unit 14 before that data is written in the HDDs 25.

A first operation example of the storage apparatus 10 according to this embodiment with the aforementioned arrangement will be described below.

Figure 8:
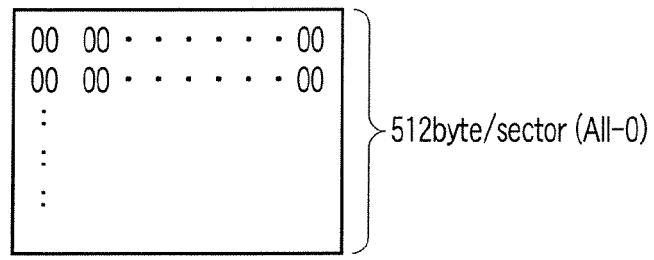
FIG. 8 shows an all-0 data pattern.
Figure 9:
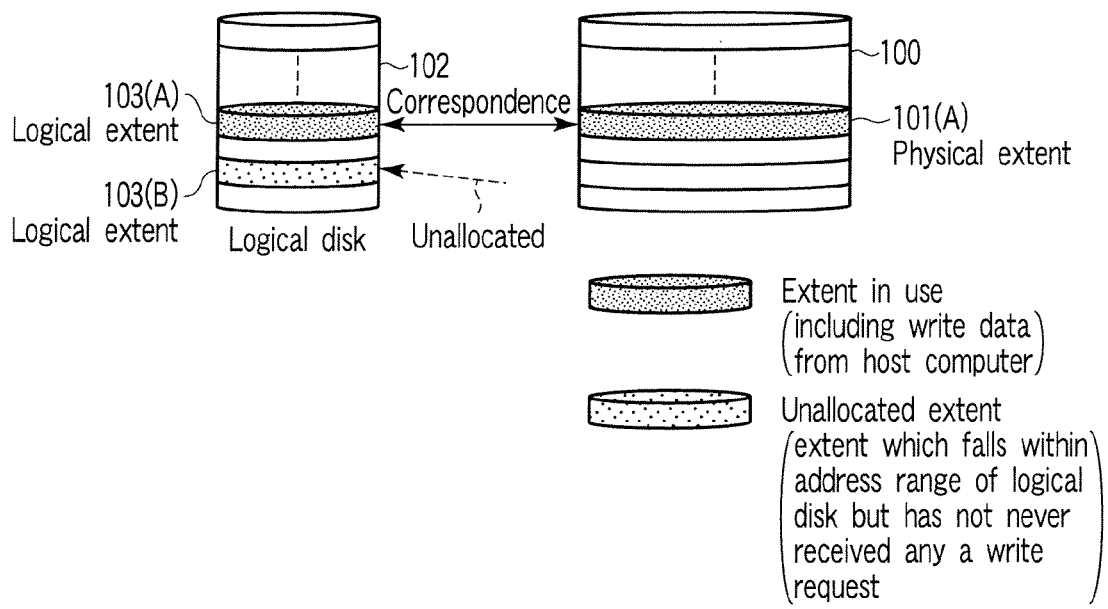
FIG. 9 is a schematic view showing an example of correspondences between physical extents and logical extends.

That is, the storage apparatus 10 according to this embodiment is initialized when the initialization unit 20 writes, for example, all-0 data shown in FIG. 8 as data of respective sectors in the physical extent 101 which is not allocated to the logical disk 102.

Next, the host computer 30 creates a file system on the logical disk 102 via the host interface 12 and disk interface 23, and writes files.

The physical extent assurance unit 15 assures the physical extent 101 corresponding to the logical extent 103 corresponding to an area where the write access has occurred, and data is written at that address.

The pattern matching unit 18 sets, as an unused end address, a sector address immediately before a sector with the smallest address of sectors in the physical extent 101 where the data write has occurred.

Upon deleting a written file, the host computer 30 writes a predetermined data pattern, e.g., an all-0 data pattern shown in FIG. 8 in sectors where the file was stored.

Upon execution of the write access of the predetermined write pattern in this way, the pattern matching unit 18 detects the predetermined data pattern when the cache management unit 14 performs DMA transfer to the HDDs 25 in the storage apparatus 10. Furthermore, in this case, when the write address neighbors the unused end address in the physical extent 101 in a direction to increment an address, the end address of the write access range is set as an unused end address.

Upon reception of a read access of sectors on the logical extent having no write access history from the host computer 30, that logical extent is not associated with the physical extent, and the data pattern generation response unit 16 generates a predetermined data pattern, e.g., an all-0 data pattern, and returns that data pattern to the host computer 30 via the host interface 12.

As a result of file deletion from the host computer 30, when the unused end address in the physical extent 101 matches the end address of the physical extent, the pattern matching unit 18 determines that the entire area of the physical extent 101 becomes unused from the host computer 30, and the physical extent release unit 19 deletes the allocation of that physical extent 101 to the logical disk 102.

A second operation example of the storage apparatus 10 according to this embodiment will be described below.

An operation example in which the pattern matching unit 18 checks the data pattern of the storage area simultaneously with disk drive accesses which aim at patrols such as RAID redundancy data consistency confirmation of the array 100, disk media access availability check, and the like will be described.

More specifically, the storage apparatus 10 according to this embodiment is initialized when the initialization unit 20 writes, for example, all-0 data shown in FIG. 8 as data of respective sectors in the physical extent 101 which is not allocated to the logical disk 102.

Next, the host computer 30 creates a file system on the logical disk 102 via the host interface 12 and disk interface 23, and writes files.

The physical extent assurance unit 15 assures the physical extent 101 corresponding to the logical extent 103 corresponding to an area where the write access has occurred, and data is written at that address.

The pattern matching unit 18 sets, as an unused end address, a sector address immediately before a sector with the smallest address of sectors in the physical extent 101 where the data write has occurred.

Upon deleting a written file, the host computer 30 writes a predetermined data pattern, e.g., an all-0 data pattern shown in FIG. 8 in sectors where the file was stored.

After execution of the write access of the predetermined write pattern in this way, the pattern matching unit 18 makes a data read to check RAID redundancy at predetermined cycles, and checks, in turn from the first sector of the physical extent 101, whether or not the readout sectors correspond to a file unused area having a specific data pattern, in addition to the redundancy check.

Furthermore, the pattern matching unit 18 holds, as an unused end address, the maximum address of the continuous predetermined data pattern in the physical extent 101. When the entire area of the physical extent 101 matches the predetermined data pattern which continuously indicates unused sectors, it is determined that the entire area of the physical extent 101 is unused, and the allocation of the physical extent 101 to the logical disk 102 is deleted. Then, that physical extent 101 is set as a waiting physical extent 101 which can be allocated to another logical disk 102.

Upon reception of a write access to an address smaller than the unused end address in the physical extent 101 from the host computer 30 before the pattern matching unit 18 determines that the entire area of the physical extent 101 is unused, the pattern matching unit 18 updates the unused end address in the physical extent 101 to an address immediately before the smallest address of the received write access, and continues to check a data pattern at predetermined cycles to have a sector next to the unused end address in the physical extent 101 as the start point.

As described above, in the storage apparatus 10 according to this embodiment, by the aforementioned operation, the host apparatus 30 writes a predetermined data pattern in a deleted sector area, and this predetermined data pattern is detected for respective sectors, thus autonomously recognizing an unused physical area. In this way, a physical extent 101 unused on the logical disk 102 can be effectively reused for another application without requiring any management information of each unused sector and without imposing another processing load.

Data of a logical extent which has never undergone a write access on a physical area or the logical disk 102 where a deleted file was stored is no longer read from the host computer 30. In this way, a risk of information leakage to ill-intentioned users and the like can be avoided.

Second Embodiment

The second embodiment of the invention will be described hereinafter.

Since a storage apparatus according to this embodiment is a modification of that according to the first embodiment, the same reference numbers denote the same components to avoid a repetitive description thereof, and only different parts will be described.

Figure 10:
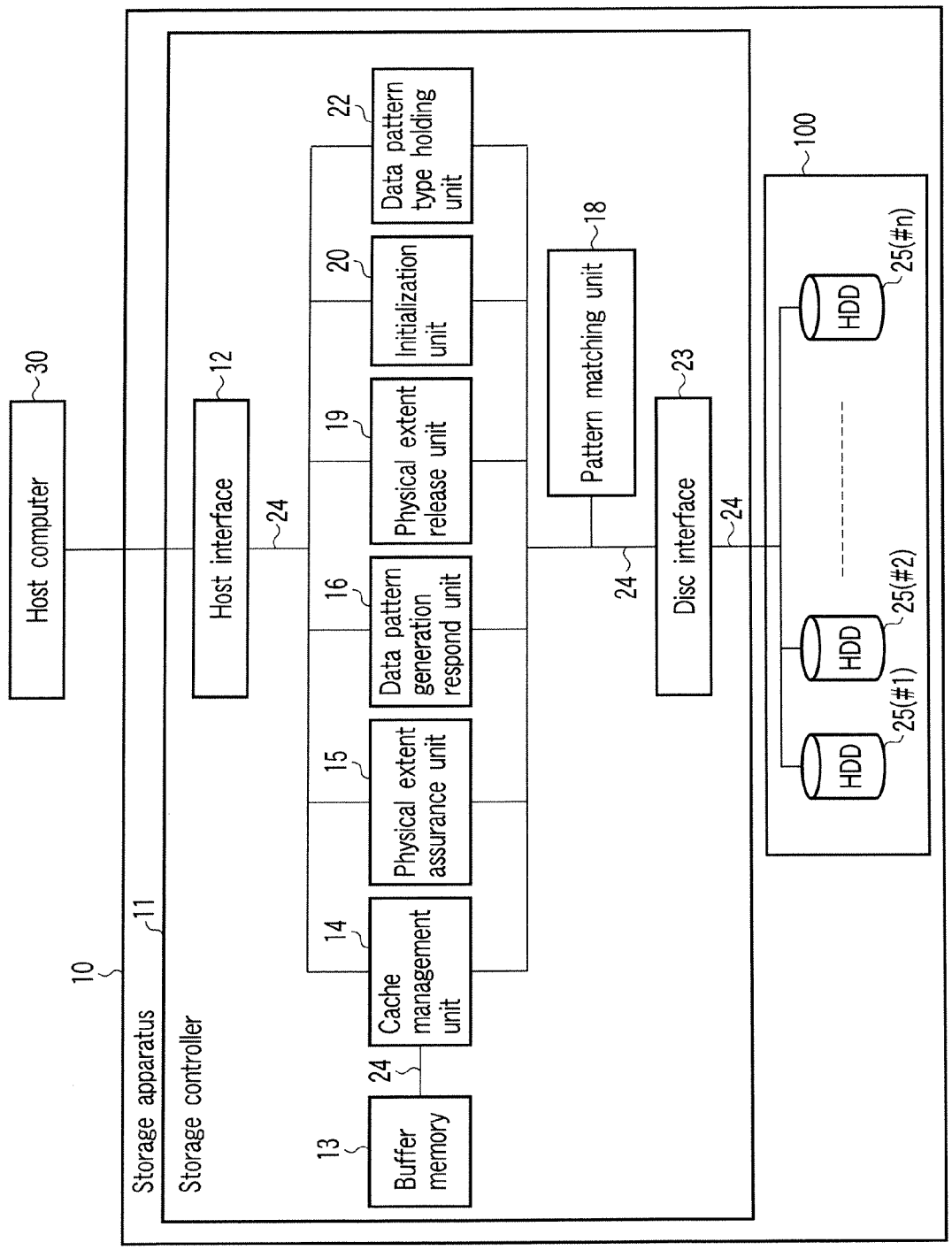
FIG. 10 is a block diagram showing an example of the arrangement of a storage apparatus according to the second embodiment.

FIG. 10 is a block diagram showing an example of the arrangement of a storage apparatus according to the second embodiment.

In the storage apparatus according to the first embodiment, only one type of the predetermined data pattern is used. However, in the storage apparatus according to this embodiment, the respective units in the storage controller 11 handle a plurality of predetermined data patterns. The data pattern generation response unit 16 generates not only one type of data pattern, e.g., an all-0 data pattern, but also some different data patterns such as a pattern, e.g., an all-1 data pattern, and the like. Accordingly, the pattern matching unit 18 detects whether or not the entire area of the assured physical extent 101 defines one of the plurality of predetermined data patterns. If the pattern matching unit 18 detects that the entire area of the assured physical extent 101 defines one of the plurality of predetermined data patterns, it deletes the allocation of the assured physical extent 101 to the logical disk 102. Other units handle the plurality of types of data patterns, as will be described in an operation example to be described later.

In association with handling of the plurality of predetermined data patterns, the storage apparatus according to this embodiment shown in FIG. 10 has an arrangement obtained by adding a data pattern type holding unit 22 to the storage apparatus according to the first embodiment shown in FIG. 1.

The data pattern type holding unit 22 holds predetermined data types for the logical extents 103. Upon reception of a read request from the host computer 30, the data pattern type holding unit 22 returns a data pattern corresponding to the data pattern type held in association with the corresponding logical extent 103 to the host computer 30.

An operation example of the storage apparatus according to this embodiment with the aforementioned arrangement will be described below.

The respective logical extents 103 are assigned numbers that can specify them. Sectors on the unallocated physical extent 101 are initialized by a predetermined data pattern shown in FIG. 11A by the initialization unit 20, and a pattern number corresponding to this data pattern is held by the data pattern type holding unit 22.

A case will be exemplified below wherein the data pattern generation response unit 16 generates two types of predetermined data patterns shown in FIGS. 11A and 11B, i.e., an all-0 data pattern (pattern number=0) and an all-1 data pattern (pattern number=1).

The data pattern type holding unit 22 holds a correspondence table between pattern numbers corresponding to the data patterns and the numbers of the logical extents 103, as shown in FIG. 12. For example, in case of FIG. 12, a data pattern corresponding to a logical extent number 100 is a pattern number=0, and a data pattern corresponding to a logical extent number 101 is a pattern number=1.

Upon reception of a read request to the logical extent 103, to which no physical extent 101 is allocated, from the host computer 30, the data pattern type holding unit 22 acquires the pattern number of the data pattern with reference to the correspondence table shown in FIG. 12. The data pattern type holding unit 22 returns the data pattern corresponding to this pattern number to the host computer 30 as read data.

On the other hand, upon reception of a read request to the logical extent 103, to which the physical extent 101 is allocated, from the host computer 30, the disk interface 23 actually makes a read access from a storage area corresponding to the physical extent 101, and read data is returned to the host computer 30 via the host interface 12.

When the host computer 30 deletes a file, the data pattern with the pattern number=0 is written in a storage area where file data was stored.

On the other hand, assume that the host computer 30 creates a file in which sectors corresponding to the data pattern with the pattern number=1 repetitively appear, and which has a size larger than that of the physical extent 101. In this case, when the pattern matching unit 18 determines that the entire area of the physical extent 101 corresponds to one of the predetermined data patterns in the logical extent to which the physical extent 101 has already been allocated, a new correspondence is added to the correspondence table shown in FIG. 12, which is held in the data pattern type holding unit 22, and the allocation of the physical extent 101 to the local disk 102 is released.

Since the storage apparatus according to this embodiment operates, as described above, a physical area where a file in which the data pattern with the pattern number=1 repetitively appears exists need not be held in addition to file deletion, and more flexible handling is allowed, in addition to the operation effects described in the first embodiment.

The best mode of carrying out the invention has been described with reference to the accompanying drawings. However, the present invention is not limited to such specific arrangements. Within the scope of the invented technical idea defined by the claims of the present invention, those skilled in the art can hit upon various changes and modifications, and it is understood that these changes and modifications belong to the technical scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A storage apparatus which configures an array that combines one or more storage media and defines storage areas of the storage media as a continuous single area, segments an entire area of the array into a plurality of physical extents, and configures and allocates a logical disk recognizable from a host computer by combining one or more physical extents, the apparatus comprising:

a unit configured to manage correspondences of the physical extents to the logical disk accessed from the host computer, and to reserve a physical extent corresponding to a logical extent of interest among logical extents, on the logical disk, associated with the physical extents every time a write access is received from the host computer;

a unit configured to generate a predetermined data pattern and to return the predetermined data pattern as read data in response to a read request from the host computer;

a deleting unit configured to detect whether or not an entire area of the reserved physical extent defines the predetermined data pattern by checking a data pattern of a storage area every time an access to the storage media is made or periodically, and to delete, when the entire area of the reserved physical extent defines the predetermined data pattern, a logical disk allocation of the reserved physical extent; and a unit configured to detect, when the host computer issues a delete request of data of a file created on the logical disk, that the entire area of the reserved physical extent defines the predetermined data pattern by writing the predetermined data pattern in a storage area where the data to be deleted was stored, to release the reserved physical extent, and to return the predetermined data pattern when the host computer issues a read request to the logical extent corresponding to the released physical extent, wherein the deleting unit checks the data pattern of the storage area in turn from a first sector of the physical extent, holds an unused end address as an address of a last sector of the continuous predetermined data pattern, sets an address of a sector immediately before checked sectors which undergo a write access as the unused end address when the write access is made to the checked sectors, determines that the entire area of the physical extent is unused when the unused end address matches an end address of the physical extent, and deletes the logical disk allocation of the physical extent.

2. The apparatus according to claim 1, which further comprises a unit configured to define an initial correspondence between the physical extent and the logical disk, and to initialize the entire area of the physical extent by the predetermined data pattern upon defining the correspondence.

3. The apparatus according to claim 1, wherein the deleting unit makes a disk drive access including at least one of a RAID redundancy data consistency confirmation of the array and a disk media access permission/denial check simultaneously with the checking.

4. The apparatus according to claim 1, which further comprises:
a buffer memory configured to temporarily store data corresponding to a write request from the host computer before the data is written in the storage media; and
a data bus configured to connect the storage media and the buffer memory, and
in which the deleting unit checks the data pattern of the storage area on the data bus upon making a direct memory access between the storage media and the buffer memory, and when the deleting unit detects sectors of the predetermined data pattern, and when addresses of the sectors include an address which neighbors the unused end address in a direction to increment an address, the deleting unit sets an end address of the access with the predetermined data pattern, which includes the neighboring address, as a new unused end address.

5. The apparatus according to claim 4, wherein the deleting unit checks the data pattern on the data bus not for all sectors but for only data with a predetermined size in a predetermined area in one or a plurality of predetermined sectors, and when the data matches the predetermined pattern data, the deleting unit checks the data pattern for all the sectors.

6. The apparatus according to claim 1, which further comprises a unit configured to transfer, when a read access to a logical extent, to which the physical extent is not allocated, is received from the host computer, the predetermined data pattern to the host computer as read data.

7. The apparatus according to claim 1, wherein a plurality of predetermined data patterns exist,
the deleting unit detects whether or not the entire area of the reserved physical extent defines one of the plurality of predetermined data patterns, and when the deleting unit detects that the entire area of the reserved physical extent defines one of the plurality of predetermined data patterns, the deleting unit deletes the logical disk allocation of the reserved physical extent, and
the storage apparatus further comprises:
a unit configured to hold predetermined data pattern types for the logical extents, and to return, when a read request is received from the host computer, a data pattern corresponding to the data pattern type held in association with the corresponding logical extent to the host computer.

* * * * *